United States Patent
Samuel et al.

(10) Patent No.: US 6,918,018 B2
(45) Date of Patent: Jul. 12, 2005

(54) 64-BIT SINGLE CYCLE FETCH SCHEME FOR MEGASTAR ARCHITECTURE

(75) Inventors: Roshan J. Samuel, Richardson, TX (US); Jason D. Kridner, Houston, TX (US)

(73) Assignee: Texas Instruments Incorporated, Dallas, TX (US)

( * ) Notice: Subject to any disclaimer, the term of this patent is extended or adjusted under 35 U.S.C. 154(b) by 306 days.

(21) Appl. No.: 10/259,309

(22) Filed: Sep. 27, 2002

(65) Prior Publication Data

US 2004/0064665 A1 Apr. 1, 2004

(51) Int. Cl.⁷ .............................................. G06F 12/00
(52) U.S. Cl. ...................... 711/157; 711/167; 365/220; 712/206
(58) Field of Search .................. 365/189.02, 220, 365/221, 230.03; 711/157, 167; 712/206, 207, 215

(56) References Cited

U.S. PATENT DOCUMENTS 6,240,046 B1 * 5/2001 Proebsting .................. 365/233

2003/0005261 A1 * 1/2003 Sheaffer ........................ 712/35
2004/0073591 A1 * 4/2004 Giacalone .................... 708/650

* cited by examiner

Primary Examiner—Chirstian P. Chace

(74) Attorney, Agent, or Firm—Robert D. Marshall, Jr.; W. James Brady, III; Frederick J. Telecky, Jr.

(57) ABSTRACT

The 64-bit single cycle fetch method described here relates to a specific 'megastar' core processor employed in a range of new digital signal processor devices. The 'megastar' core incorporates 32-bit memory blocks arranged into separate entities or banks. Because the parent CPU has only three 16-bit buses, a maximum read in one clock cycle through the memory interface would normally be 48-bits. This invention describes an approach for a fetch method involving tapping into the memory bank data at an earlier stage prior to the memory interface. This allows the normal 48-bit fetch to be extended to 64-bits as required for full performance of the numerical processor accelerator and other speed critical operations and functions.

8 Claims, 2 Drawing Sheets

64-BIT SINGLE CYCLE FETCH SCHEME FOR MEGASTAR ARCHITECTURE

TECHNICAL FIELD OF THE INVENTION

The technical field of this invention is computer architecture and more particularly data movement in computer systems.

BACKGROUND OF THE INVENTION

The basic architecture of a wide range of digital signal processors having embedded numerical processor accelerators has been labeled the 'megastar' architecture. FIG. 1 illustrates the block diagram of the 'megastar' architecture. The central processor unit 100 is linked by busses 117 to internal memory including ROM 102, single-access SARAM 103, and dual-access DARAM 104 by way of memory interface unit (MIF) 105. MIF also links the processor and internal memory to external memory bus 115 via DMA 107 and external memory interface 106. The peripheral interface unit (PIF) 108 provides a bus 110 to a number of external peripherals as denoted by ports 111, 112, 113 and 114.

The numerical co-processor unit 101 communicates exclusively with the main CPU 100 via bus 109. This numerical co-processor could be a co-processor crafted for efficient processing of floating point data. Alternatively it could be of special purpose design to do other specific functions, encoding or decoding of complex data for example. Co-processors, such as block 101 are included to speed-up computations and are referred to as 'accelerators'.

The 48-bit single cycle fetch of the conventional 'megastar' architecture is illustrated in FIG. 2. The CPU 201 is programmed to fetch 48-bits through memory interface unit (MIF) 203. This fetch is accomplished in three busses 220, 221 and 222, composite busses containing address, data and control signals. The CPU sends addresses over these three busses and receives 'read' data in return. Memory is organized as 32-bit wide data banks, illustrated as combined SARAM and DARAM banks in FIG. 2 by Bank-0 204, and Bank-1 205. Memory bank-0 204 is connected to MIF 203 via bus 214. Memory bank-1 205 is connected to MIF 203 via bus 215.

Because memory in the megastar architecture is composed of 32-bit word banks, the MIF 203 in the 'megastar' architecture handles the 32-bit to 16-bit translation and appropriate address decoding to fetch the desired 16-bit 'half-word' at each of the composite busses 220, 221, and 222. The MIF 203 can pass to the CPU any three half words addressed by busses 220, 221, and 222. Two of these busses can be used to select both the upper and lower half-words of a single 32-bit word stored in the memory banks 204 and 205.

Summarizing, the three 16-bit read busses 220, 221, and 222 allow for 48-bits to be fetched on a single clock cycle. While this type of fetch is adequate for a variety of applications, it is often desirable to fetch a full 64-bits of data (two 32-bit words) on a single clock cycle to achieve maximum performance in the accelerator.

The processor configuration illustrated in FIG. 2 may alternatively, in one cycle, fetch a 32-bit word, for example using busses 220 and 221. That same cycle can fetch another 16-bit half-word that is either the upper or lower 16-bits of a second 32-bit word, for example using bus 222. A second fetch must be added to obtain the remaining half-word of the said second 32-bit word.

SUMMARY OF THE INVENTION

This invention describes a hardware approach allowing a 64-bit fetch from memory on one clock cycle for the 'megastar' processor core. The 'megastar' core incorporates 32-bit word memory units broken out into separate 'entities' or 'banks'. However, the host processor chip itself has only three 16-bit read buses. This means that the maximum read that can be done in one clock cycle is 48-bits. In certain applications, such as the digital audio floating-point accelerator for example, it is necessary to fetch and multiply two 32-bit numbers in one clock cycle. Since the memories are organized as 32-bit word banks, if the software attempts to fetch two 32-bit words, and these words are located in different banks, it is possible to recover the last 16-bits and append it to the 48-bits from the CPU to yielding a full 64-bits. The scheme described here is directed toward efficient handling this situation with minimal changes to the existing megastar architecture.

BRIEF DESCRIPTION OF THE DRAWINGS

These and other aspects of this invention are illustrated in the drawings, in which.

DETAILED DESCRIPTION OF PREFERRED EMBODIMENTS

Figure 1:
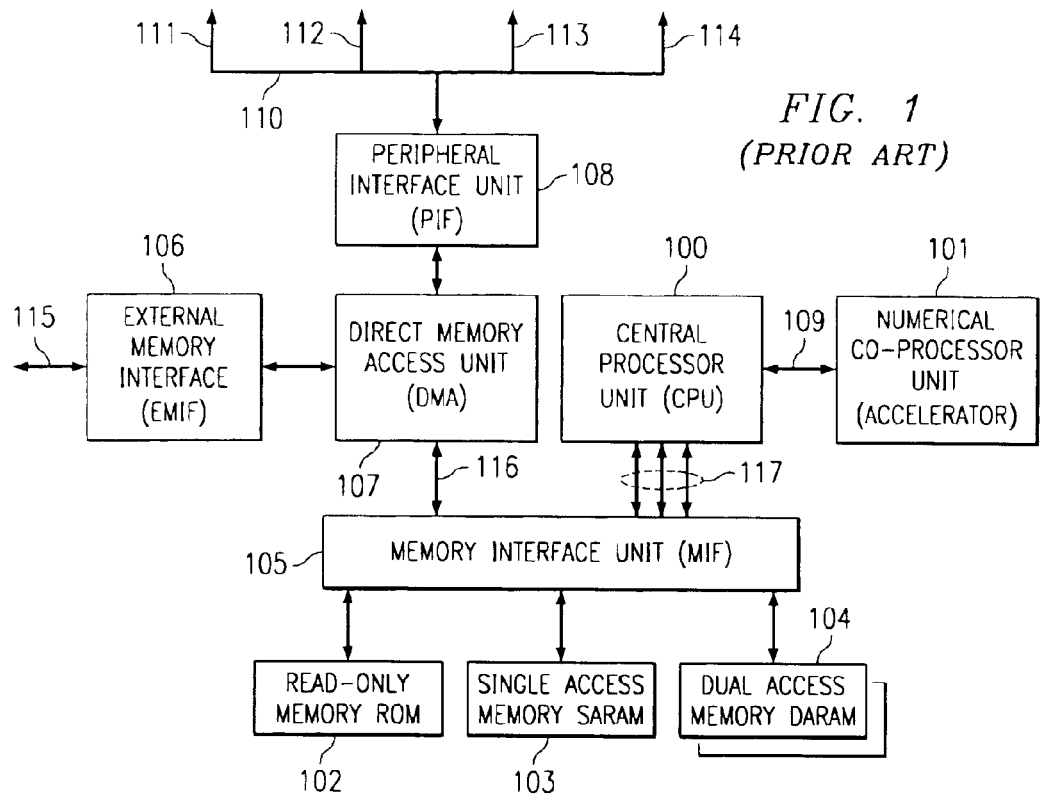
FIG. 1 illustrates the block diagram of a megastar architecture central processor chip having a numerical process accelerator embedded (Prior Art)
Figure 2:
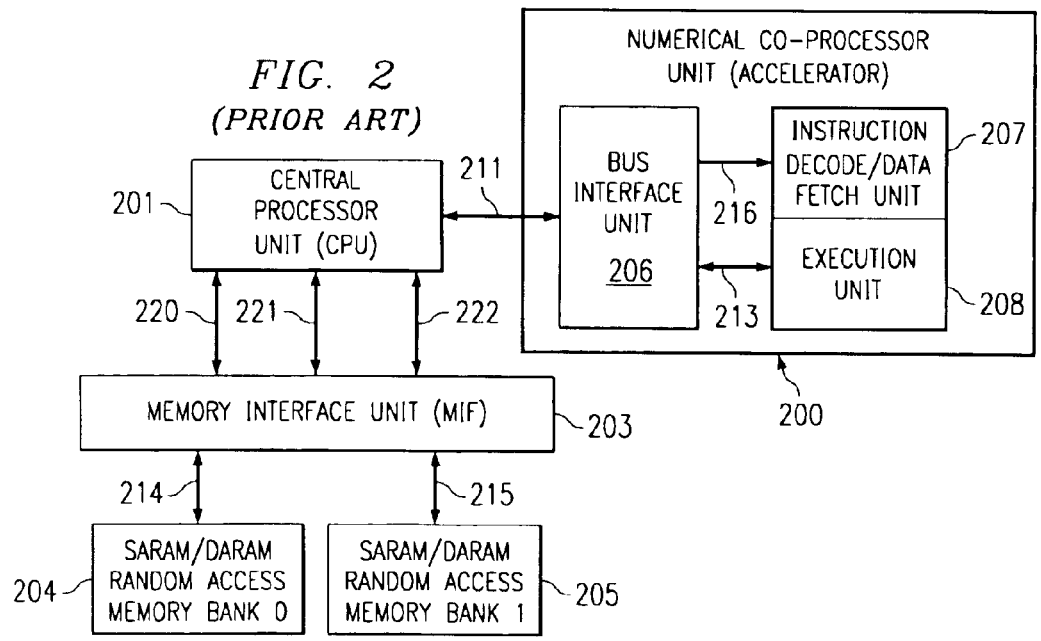
FIG. 2 illustrates the block diagram of a 'megastar' architecture with conventional numerical process accelerator having three 16-bit busses allowing for only 48-bits of data fetch on a single clock cycle (Prior Art)
Figure 3:
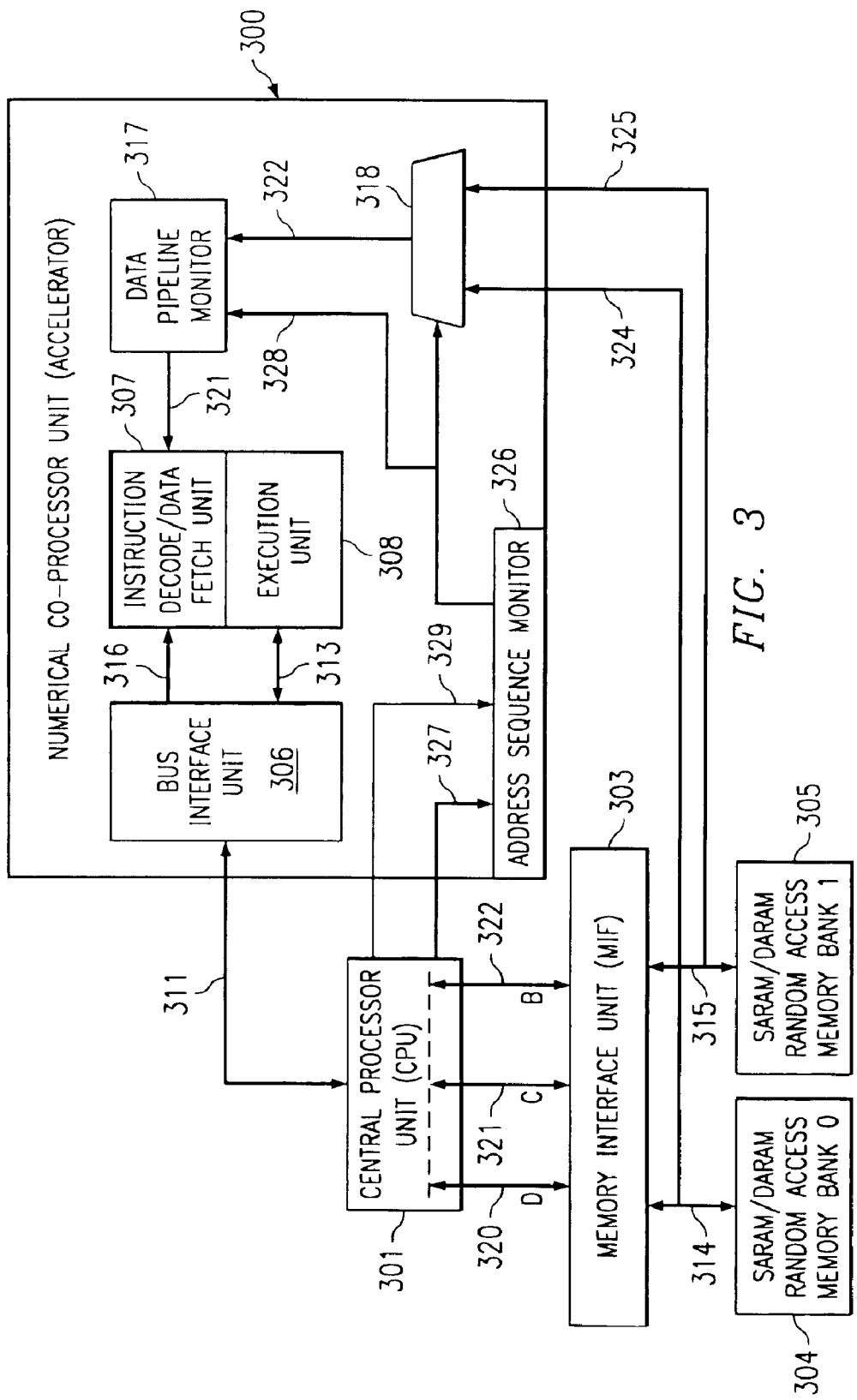
FIG. 3 illustrates the block diagram of a 'megastar' architecture with numerical process accelerator and including the added data fetch hardware of this invention allowing the accelerator to fetch a full 64-bits of data on a single clock cycle.

The 64-bit single cycle fetch method of this invention is illustrated in FIG. 3. The CPU 301 is programmed to fetch 48-bits through memory interface unit (MIF) 303. This fetch is accomplished in busses 320, 321 and 322, composite busses containing address, data and control signals. The CPU sends addresses over these three busses and receives 'read' data in return. Memory is organized as 32-bit wide data banks, illustrated as combined SARAM and DARAM banks in FIG. 2 by Bank-0 304, and Bank-1 305. Memory bank-0 304 is connected to MIF 303 via bus 314. Memory bank-1 305 is connected to MIF 303 via 315. The 48-bits of data fetched by the CPU is passed to the numerical co-processor unit via path 311 through the bus interface unit 306 and on to the instruction decode/data fetch unit 307 via path 316. The present invention describes the method by which an additional 16-bits of fetched data is retrieved through path 321 from the data pipeline monitor 317.

Because memory in the megastar architecture is composed of 32-bit word banks, the MIF 303 in the 'megastar' architecture handles the 32-bit to 16-bit translation and appropriate address decoding to fetch the desired 16-bit 'half-word' at each of the three composite busses 320, 321, and 322. The three 16-bit read busses 320, 321, and 322 allow for 48-bits to be fetched on a single clock cycle.

A common operation in the conventional megastar architecture would be to fetch, in one clock cycle, one full 32-bit operand and one half of another 32-bit operand in the third bus. Both the most significant 'half word' and least significant 'half word' of the first operand would pass through two of the three busses. The third bus would be used to fetch one half of the second 32-bit operand either most significant or least significant 16-bits. Then a second clock cycle would be used to fetch the remaining half word of the second operand.

If one 32-bit operand, two 16-bit 'half words' are located in the same location in the same block of memory, then the method and hardware described here provides for the 'capture' of the last 16-bits of that 32-bit operand as it is output by the memory. One bus, 320, 321, or 322, must be selected as the bus that addresses these last sixteen bits. Assume this is the B-bus 322. Assume also that these 16-bits are in the least significant bit LSB positions of the memories.

The 16 LSB data bits of each memory bank prior to the point where they enter the memory interface are fed to a multiplexer 318 via paths 324 and 325. The address lines of the B-bus 322 are fed to the address sequence monitor block, 326, and forwarded to the select input to the multiplexer 318 via paths 327 and 328. This will allow for the correct bits to be routed to the data pipeline monitor 317.

Data Pipeline Monitor

Because the central processor unit 301 of the 'megastar' core implements look-ahead pipelining to speed up data fetches, there are timing considerations which must be observed to successfully obtain an increase in the width of the fetched data. When the accelerator 300 is acting to fetch the second half word directly from the RAM via paths 324 or 325, the address present at the address ports is not in step time-wise with the address from which data is being fetched at a given time. This makes it necessary to add data pipeline monitor hardware 317 as a means to keep the data current for the accelerator.

The data pipeline monitor 317 is, in its most simplified form, a series of 16-bit registers that transfer data from one stage to the next on each clock. The number of registers required in the series is equal to the number of stages of pipeline added prior to the execution stage of the CPU 301. This assures that when the CPU issues a co-processor instruction to the accelerator via path 311, the 48-bits just received from the CPU will match up with the 16-bits currently in the co-processor execution unit 308.

If the CPU initiates a pause in the pipeline for multi-cycle instructions, it is necessary for the pause signal 329 to generate a pause in the data pipeline monitor also. In case of a branch instruction, the normal procedure is that the pipeline will be flushed. In such an event, the accelerator pipeline needs to be flushed also. Doing this may be as simple as monitoring the address busses 320, 321, and 322 as illustrated by address sequence monitor block 326. A non-consecutive address fetch may indicate a branch with flush. This requires that the CPU pass the flush signal 329 to the accelerator if the CPU is capable of doing flushes without a change in address sequence.

The heart of the invention lies in the capability of processor configuration illustrated in FIG. 3, in one cycle, to fetch a 32-bit word, for example using busses 320 and 321. That same cycle can fetch another 16-bit half-word that is either the upper or lower 16-bits of a second 32-bit word, for example using bus 322. Additionally, the same cycle allows for the remaining half-word of the said second 32-bit word to be passed to the numerical co-processor 300 via paths 324 or 325. The invention may be implemented with minimal revisions to overall hardware. These revisions are comprised mainly of the addition of address sequence monitor 326, multiplexer 318 and data pipeline monitor 317.

What is claimed is:

1. A data processing apparatus comprising:
    a central processor unit having three N-bit composite busses each of said busses carrying data, address, and control words;
    an internal memory partitioned into two memory banks;
    a memory interface unit connecting said central processor unit and said internal memory, said memory interface unit responsive to two addresses for supplying said central processor unit an N-bit data word from each memory bank corresponding to a first address on a first N-bit composite bus and one N-bit data word from a selected memory bank corresponding to a second address on a second N-bit composite bus;
    a pair of data paths each directly connected to one of said memory banks of said internal memory, a first data path carrying an N-bit data word corresponding to said first address and a second data path carrying an N-bit data word corresponding to said second address; and
    a numerical co-processor receiving three N-bit data words from said central processor unit and directly connected to said pair of data paths for receiving one N-bit data word from a memory bank opposite to said selected memory bank corresponding to said second address.

2. The data processing apparatus of claim 1 wherein:
    said numerical co-processor including a data multiplexer having two inputs connected to respective ones of said pair of data paths, one output and a control input receiving a selection, said data multiplexer coupling a selected one of said two inputs to said output dependent upon said selection signal at said control input; and
    said central processing unit is further connected to said data multiplexer, said central processing unit supplying a selection signal corresponding to said second address to said control input of said data multiplexer.

3. The data processing apparatus of claim 2 wherein:
    said memory stores (2N)-bit data words including the most significant N-bits in said first memory bank and the least significant N-bits in said second memory bank; and
    said third bus receiving most significant bits corresponding to said second address and said data multiplexer receiving least significant bits corresponding to said first address via said first data path and least significant bits corresponding to said second address via said second data path.

4. The data processing apparatus of claim 1 wherein:
    said numerical co-processor unit includes a data pipeline register receiving one N-bit data word from memory from said memory bank opposite said selected memory bank corresponding to said second address, said data pipeline register temporarily storing said one N-bit data word until said two N-bit data words from separate memory banks corresponding to first address and said one N-bit data word from said selected memory bank corresponding to said second address are both received from said central processing unit.

5. The data processing apparatus of claim 4 wherein:
    said data pipeline register includes a serial chain of N-bit register stages.

6. The data processing apparatus of claim 4 wherein:
    said central processor unit generates a pause signal causing a pause in the data pipeline register.

7. The data processing apparatus of claim 4 wherein:
    said central processor unit generates a flush signal causing a data flush in said data pipeline register.

8. The data processing apparatus of claim 4 wherein:
    said numerical co-processor monitors instruction addresses and flushes said data pipeline register on detection of a discontinuity of instruction addresses.

* * * * *